United States Patent
Jiang et al.

(10) Patent No.: US 9,106,294 B2
(45) Date of Patent: Aug. 11, 2015

(54) APPARATUS AND METHOD FOR UPLINK CLOSED LOOP TRANSMIT DIVERSITY

(75) Inventors: Yibo Jiang, San Diego, CA (US); Sharad Deepak Sambhwani, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 757 days.

(21) Appl. No.: 13/346,590

(22) Filed: Jan. 9, 2012

(65) Prior Publication Data

US 2012/0178381 A1    Jul. 12, 2012

Related U.S. Application Data

(60) Provisional application No. 61/431,375, filed on Jan. 10, 2011.

(51) Int. Cl.
| | | |
|---|---|---|
| *H04B 1/00* | (2006.01) | |
| *H04B 7/00* | (2006.01) | |
| *H04B 7/06* | (2006.01) | |
| *H04B 7/04* | (2006.01) | |
| *H04B 7/02* | (2006.01) | |

(52) U.S. Cl.
CPC ............ *H04B 7/0617* (2013.01); *H04B 7/0404* (2013.01); *H04B 7/0634* (2013.01); *H04B 7/0652* (2013.01)

(58) Field of Classification Search
CPC ... H04B 7/0404; H04B 7/0617; H04B 7/0634
USPC .................... 455/69, 101, 102, 103, 132, 139
See application file for complete search history.

(56) References Cited

U.S. PATENT DOCUMENTS

| | | |
|---|---|---|
| 6,816,557 B2 | 11/2004 | Kuchi et al. |
| 7,103,326 B2 | 9/2006 | Wu et al. |
| 7,561,850 B2 | 7/2009 | Hara |
| 7,729,454 B2 | 6/2010 | Chang et al. |
| 2008/0311858 A1 | 12/2008 | Cheng et al. |
| 2010/0161286 A1 | 6/2010 | Ranki et al. |
| 2010/0246516 A1 | 9/2010 | Pelletier et al. |

OTHER PUBLICATIONS

Huawei: "Uplink Close Loop Transmit Diversity for HSPA", 3GPP Draft; R1-104750 Uplink CLTD for HSPA, 3rd Generation Partnership Project (3GPP), Mobile Competence Centre ; 650, Route Des Lucioles ; F-06921 Sophia-Anti Polis Cedex ; France, vol. RAN WG1, No. Madrid, Spain; 20100823, Aug. 19, 2010, XP050450199, [ retrieved on Aug. 19, 2010] the whole document.

(Continued)

*Primary Examiner* — Eugene Yun
(74) *Attorney, Agent, or Firm* — Darren M. Simon

(57) ABSTRACT

An apparatus, method, and computer program product operable to determine a phase of a beamforming weight vector utilizing a memory of a previously used phase for the beamforming weight vector, capable of improving a channel estimate. A base station transmits a beamforming weight vector to a user equipment based on a determined channel estimate. The user equipment selects between the received beamforming weight vector, or a modified beamforming weight vector having its phase shifted by −360°, in accordance with a suitable selection criteria. That is, the selection is made such that a difference between the phase of the selected beamforming vector and a phase of a prior beamforming vector is within a predetermined range.

28 Claims, 10 Drawing Sheets

(56) References Cited

OTHER PUBLICATIONS

International Search Report and Written Opinion—PCT/US2012/020799, International Search Authority—European Patent Office, Sep. 8, 2012.
Partial International Search Report—PCT/US2012/020799—ISA/EPO—May 3, 2012.
Qualcomm Incorporated, "Link Analysis of Mechanisms to Improve Impact of Phase Discontinuity due to CLTD on NodeB Receiver", 3GPP Draft, R1-111099_Link_Analysis_Phase_Disc0ntinuity_Impact_N0DEB_RX, 3rd Generation Partnership Project (3GPP), Mobile Competence Centre, 650, Route Des Lucioles, F-06921 Sophia-Antipolis Cedex, France, vol. RAN WG1, No. Taipei, Taiwan, 20110221, Feb. 24, 2011, XP050490851, [retrieved on Feb. 24, 2011], the whole document.
Qualcomm Incorporated: "On the benefits of Uplink Closed Loop Transmit Diversity", 3GPP Draft; R1-104737_0n the Benefits of UL CLTD, 3rd Generation Partnership Project (3GPP), Mobile Copetence Centre ; 650, Route Des Lucioles ; F-06921 Sophia-Antipolis Cedex ; France, vol. RAN WGI, No. Madrid, Spain; 20100823, Aug. 17, 2010, XP050449978, [retrieved on Aug. 17, 2010].
Ericsson, St-Ericsson, "System results for HSUPA beam forming diversity with 3D antennas," R1-101300, 3GPP TSG RAN WG1 Meeting #60, San Francisco, USA, Feb. 22-26, 2010, 5.5.2., pp. 1-13.

APPARATUS AND METHOD FOR UPLINK CLOSED LOOP TRANSMIT DIVERSITY

CROSS-REFERENCE TO RELATED APPLICATIONS

This application claims priority to and the benefit of provisional patent application No. 61/431,375, titled "A Beamforming Transmitter for Beamforming Transmit Diversity," filed in the United States Patent and Trademark Office on Jan. 10, 2011, the entire content of which is incorporated herein by reference.

BACKGROUND

1. Field

Aspects of the present disclosure relate generally to wireless communication systems, and more particularly, to wireless user equipment capable of uplink closed loop transmit diversity transmissions.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. For example, recent interest has been directed to uplink transmit diversity (ULTD) schemes, which employ more than one transmit antenna (usually two) at the user equipment (UE) to improve the uplink transmission performance: e.g., to reduce the UE transmit power, to increase the UE coverage range, to increase the UE data rate, or a combination of the above. ULTD can also help improve the overall system capacity. Based on the feedback requirements, ULTD schemes can be categorized into closed-loop (CL) and open-loop (OL) schemes. From the transmitter perspective, ULTD schemes can be classified as beamforming (BF) and antenna switching (AS) schemes.

In general, closed-loop transmit diversity (CLTD) schemes require the receiver to provide explicit feedback information about the spatial channel to assist the transmitter in choosing a transmission format over the multiple transmit antennas. One category of CLTD schemes is the CLTD beamforming scheme, where the base station (Node B) feeds back to the UE a precoding (or beamforming) weight vector to be applied to signals transmitted on the multiple transmit antennas so that the signals received at the Node B are constructively added. This in turn maximizes the receiver signal to noise ratio (SNR) and achieves the beamforming effect. However, due to the wide variety of implementations of CLTD schemes, there remains substantial developmental effort to improve and enhance these systems.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a user equipment. Here, the method includes steps of transmitting a first uplink transmit diversity signal by applying a first beamforming weight vector, receiving a beamforming weight vector in response to the first uplink transmit diversity signal, determining a modified beamforming weight vector based on the received beamforming weight vector, and transmitting a second uplink transmit diversity signal by applying a selected one of the received beamforming weight vector, or the modified beamforming weight vector, selected in accordance with a selection criteria.

Another aspect of the disclosure provides a method of wireless communication operable at a user equipment. Here, the method includes steps of transmitting a first uplink transmit diversity signal by applying a first beamforming weight vector, receiving a beamforming weight vector in response to the first uplink transmit diversity signal, determining a first candidate phase based on a phase of the first beamforming vector, determining a second candidate phase based on a phase of the first beamforming vector, selecting one of the first candidate phase or the second candidate phase in accordance with a selection criteria, and transmitting a second uplink transmit diversity signal by applying the selected one of the first candidate phase or the second candidate phase.

Another aspect of the disclosure provides a method of wireless communication operable at a base station. Here, the method includes steps of receiving an uplink transmit diversity signal from a user equipment, inferring a phase of a beamforming weight vector utilized by the user equipment for the uplink transmit diversity signal, and utilizing the inferred phase to obtain a channel estimate of an uplink channel corresponding to the uplink transmit diversity signal.

Another aspect of the disclosure provides a user equipment configured for wireless communication. Here, the user equipment includes at least one processor, a memory coupled to the at least one processor, a transmitter coupled to the at least one processor for transmitting a first uplink transmit diversity signal by applying a first beamforming weight vector, and a receiver coupled to the at least one processor for receiving a beamforming weight vector in response to the first uplink transmit diversity signal. The at least one processor is configured to determine a modified beamforming weight vector based on the received beamforming weight vector, and to transmit a second uplink transmit diversity signal by applying a selected one of the received beamforming weight vector, or the modified beamforming weight vector, selected in accordance with a selection criteria.

Another aspect of the disclosure provides a user equipment configured for wireless communication. Here, the user equipment includes at least one processor, a memory coupled to the at least one processor, a transmitter coupled to the at least one processor for transmitting a first uplink transmit diversity signal by applying a first beamforming weight vector, and a receiver coupled to the at least one processor for receiving a beamforming weight vector in response to the first uplink transmit diversity signal. The at least one processor is configured to determine a first candidate phase based on a phase of the first beamforming vector, to determine a second candidate phase based on a phase of the first beamforming vector, to select one of the first candidate phase or the second candidate phase in accordance with a selection criteria, and to transmit a second uplink transmit diversity signal by applying the selected one of the first candidate phase or the second candidate phase.

Another aspect of the disclosure provides a base station configured for wireless communication. Here, the base station includes at least one processor, a memory coupled to the at least one processor, and a receiver coupled to the at least one processor for receiving an uplink transmit diversity signal from a user equipment. The at least one processor is configured to infer a phase of a beamforming weight vector utilized by the user equipment for the uplink transmit diversity signal, and to utilize the inferred phase to obtain a channel estimate of an uplink channel corresponding to the uplink transmit diversity signal.

Another aspect of the disclosure provides a user equipment configured for wireless communication. Here, the user equipment includes means for transmitting a first uplink transmit diversity signal by applying a first beamforming weight vector, means for receiving a beamforming weight vector in response to the first uplink transmit diversity signal, means for determining a modified beamforming weight vector based on the received beamforming weight vector, and means for transmitting a second uplink transmit diversity signal by applying a selected one of the received beamforming weight vector, or the modified beamforming weight vector, selected in accordance with a selection criteria.

Another aspect of the disclosure provides a user equipment configured for wireless communication. Here, the user equipment includes means for transmitting a first uplink transmit diversity signal by applying a first beamforming weight vector, means for receiving a beamforming weight vector in response to the first uplink transmit diversity signal, means for determining a first candidate phase based on a phase of the first beamforming vector, means for determining a second candidate phase based on a phase of the first beamforming vector, means for selecting one of the first candidate phase or the second candidate phase in accordance with a selection criteria, and means for transmitting a second uplink transmit diversity signal by applying the selected one of the first candidate phase or the second candidate phase.

Another aspect of the disclosure provides a base station configured for wireless communication. Here, the base station includes means for receiving an uplink transmit diversity signal from a user equipment, means for inferring a phase of a beamforming weight vector utilized by the user equipment for the uplink transmit diversity signal, and means for utilizing the inferred phase to obtain a channel estimate of an uplink channel corresponding to the uplink transmit diversity signal.

Another aspect of the disclosure provides a computer program product operable at a user equipment. Here, the computer program product includes a computer-readable medium having instructions for causing a computer to transmit a first uplink transmit diversity signal by applying a first beamforming weight vector, instructions for causing a computer to receive a beamforming weight vector in response to the first uplink transmit diversity signal, instructions for causing a computer to determine a modified beamforming weight vector based on the received beamforming weight vector, and instructions for causing a computer to transmit a second uplink transmit diversity signal by applying a selected one of the received beamforming weight vector, or the modified beamforming weight vector, selected in accordance with a selection criteria.

Another aspect of the disclosure provides a computer program product operable at a user equipment. Here, the computer program product includes a computer-readable medium having instructions for causing a computer to transmit a first uplink transmit diversity signal by applying a first beamforming weight vector, instructions for causing a computer to receive a beamforming weight vector in response to the first uplink transmit diversity signal, instructions for causing a computer to determine a first candidate phase based on a phase of the first beamforming vector, instructions for causing a computer to determine a second candidate phase based on a phase of the first beamforming vector, instructions for causing a computer to select one of the first candidate phase or the second candidate phase in accordance with a selection criteria, and instructions for causing a computer to transmit a second uplink transmit diversity signal by applying the selected one of the first candidate phase or the second candidate phase.

Another aspect of the disclosure provides a computer program product operable at a base station. Here, the computer program product includes a computer-readable medium having instructions for causing a computer to receive an uplink transmit diversity signal from a user equipment, instructions for causing a computer to infer a phase of a beamforming weight vector utilized by the user equipment for the uplink transmit diversity signal, and instructions for causing a computer to utilize the inferred phase to obtain a channel estimate of an uplink channel corresponding to the uplink transmit diversity signal.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, during communications between devices, closed loop transmit diversity (CLTD) beamforming may be used to improve data rates while using less transmit power. Thus, the CLTD beamforming scheme may allow users to experience increased uplink data rates, and/or reduced transmit power, therefore improving uplink coverage range. In this beamforming scheme, a user equipment (UE) transmitter may apply a precoding (e.g. beamforming) weight vector over multiple transmit antennas so that the signals from the transmit antennas received at a Node B may be constructively added. Such constructive addition may assist to improve a Node B receiver signal to noise ratio (SNR), therefore achieve a beamforming effect.

In beamforming transmit diversity schemes, the composite channel response seen at the receiver may have a non-smooth phase trajectory due to the variation of the beamforming phases. This non-smooth phase trajectory can adversely affect the quality of the pilot filter, reducing the usefulness of the beamforming weight vector to the transmitting entity as feedback. Thus, an improved beamforming transmitter capable of dealing with this issue is disclosed herein to reduce or avoid this problem.

Figure 1:
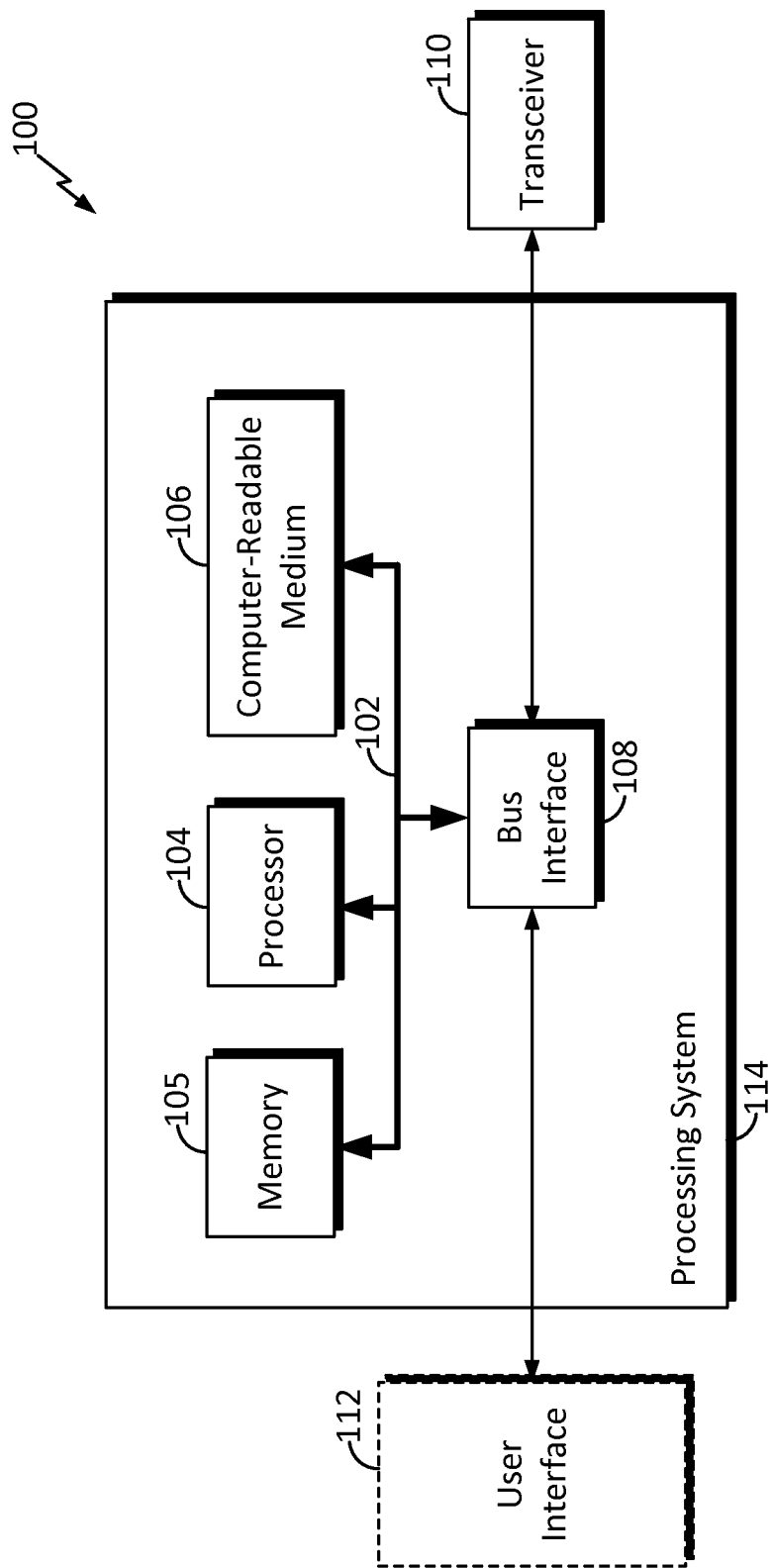
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. That is, in accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may be resident in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
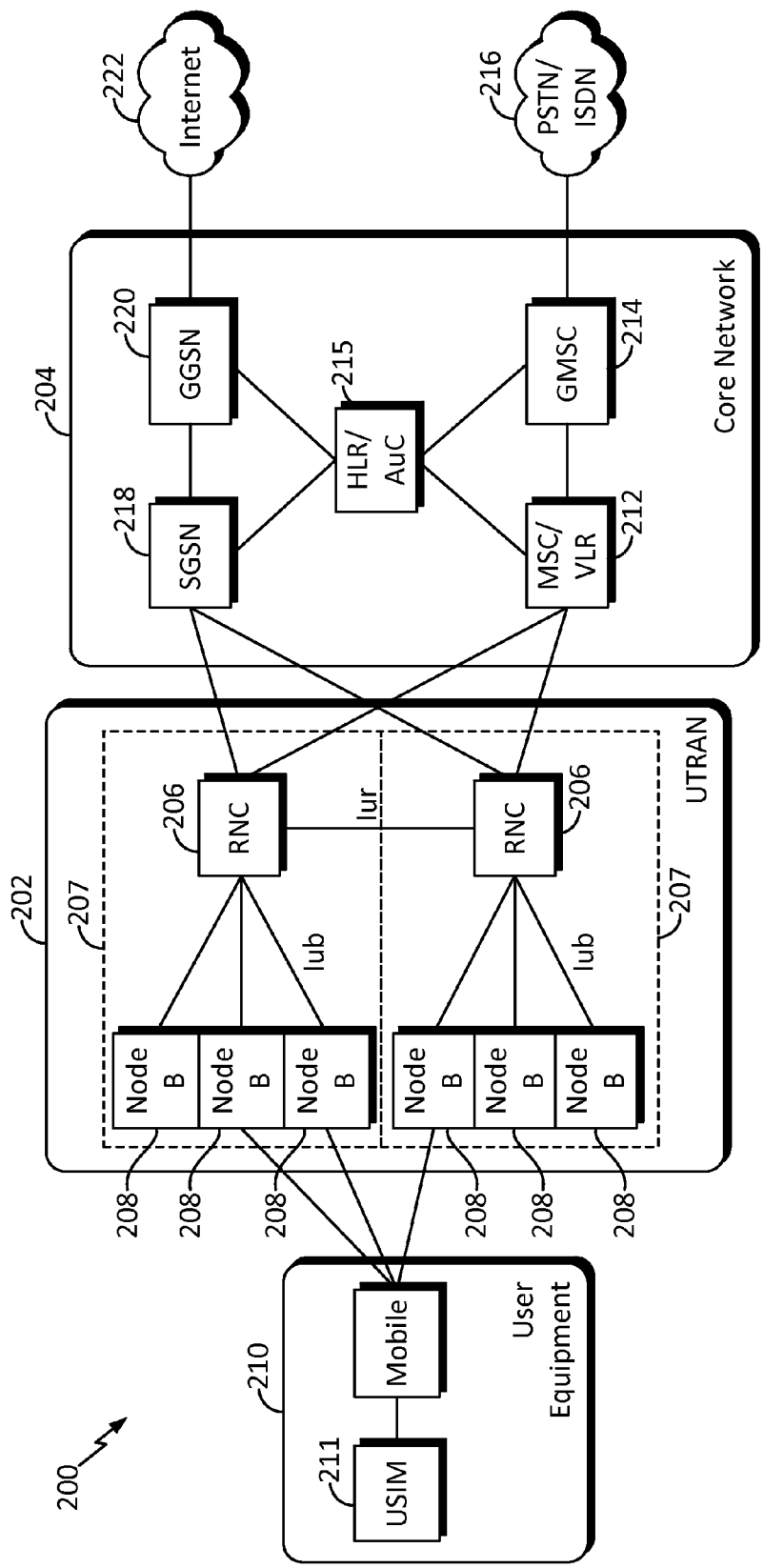
FIG. 2 is a block diagram conceptually illustrating an example of a telecommunications system.

Referring now to FIG. 2, by way of example and without limitation, various aspects of the present disclosure are illustrated with reference to a Universal Mobile Telecommunications System (UMTS) system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface standardized by the third generation partnership project (3GPP), facilitating greater throughput and reduced latency. Among other modifications over prior releases, HSPA enables the use of hybrid automatic repeat request (HARQ), shared channel transmission, adaptive modulation and coding, and spatial diversity for beamforming and MIMO. The standards that define HSPA include HSDPA (high speed downlink packet access) and HSUPA (high speed uplink packet access, also referred to as enhanced uplink, or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-DSCH may be associated with one or more HS-SCCH. The HS-SCCH is a physical channel that may be utilized to carry downlink control information related to the transmission of HS-DSCH. The UE may continuously monitor the HS-SCCH to determine when to read its data from the HS-DSCH, and to determine the modulation scheme used on the assigned physical channel.

The HS-PDSCH is a physical channel that may be shared by several UEs, and may carry downlink data for the high-speed downlink. The HS-PDSCH may support quadrature phase shift keying (QPSK) and 16-quadrature amplitude modulation (16-QAM) and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

Release 7 of the 3GPP standards introduced various enhancements to the downlink, one of which includes the implementation of multiple-input, multiple-output (MIMO). MIMO is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the Node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. The spatially precoded data streams arrive at the receiving node with different spatial signatures, which enables each of the receivers to recover the one or more the data streams destined for that receiver. To achieve good coverage at the edges of the cell, a single stream beamforming transmission may be used in combination with transmit diversity.

In later releases, many similar enhancements have been implemented for the uplink. For example, 3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. HSUPA continues to be developed, and various aspects of the present disclosure relate to the development of uplink transmissions utilizing spatial multiplexing.

Figure 3:
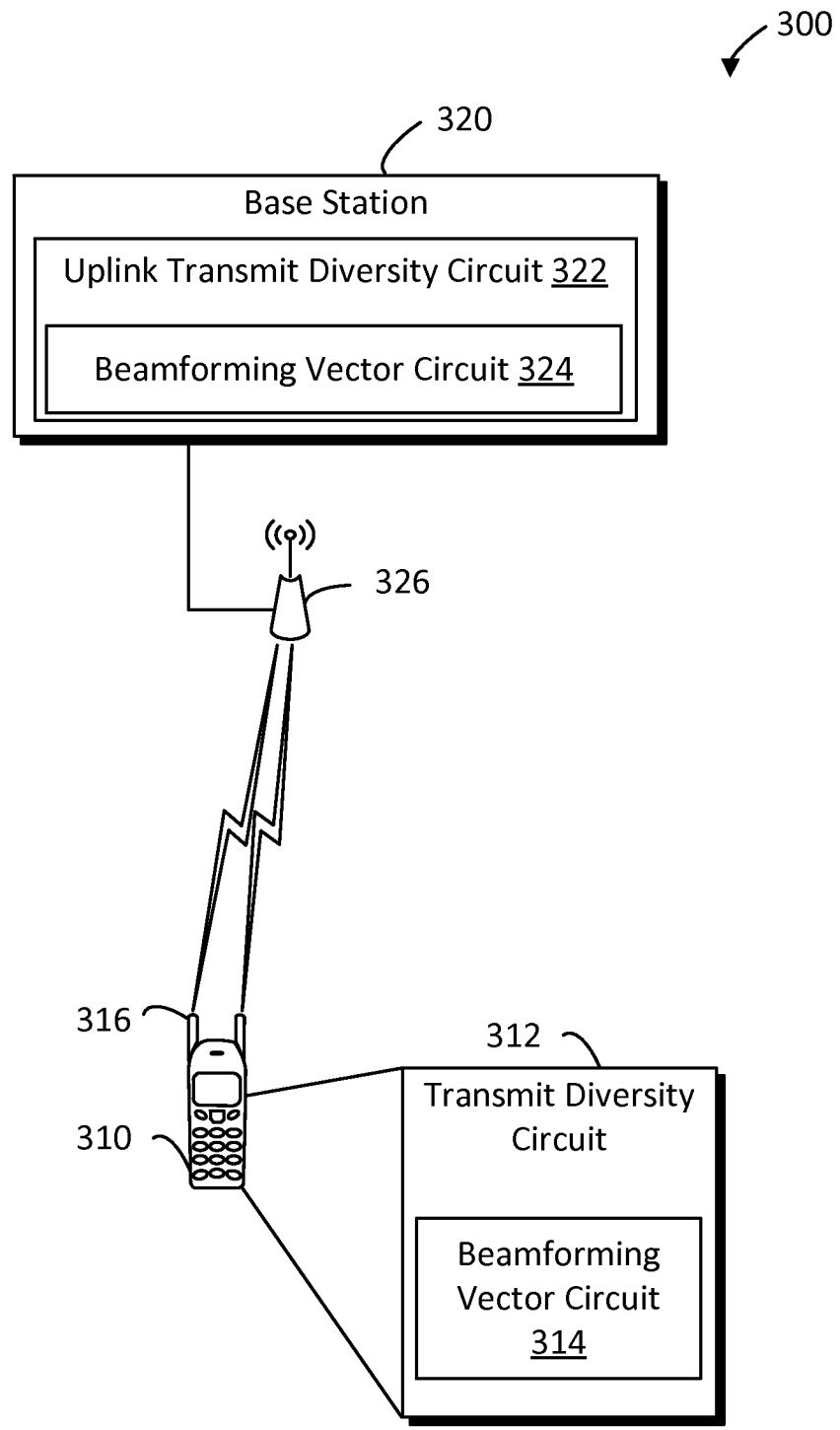
FIG. 3 is a simplified block diagram illustrating a UE in communication with a base station in a transmit diversity configuration.

With reference now to FIG. 3, a simplified block diagram showing one example of a wireless communication system 300 for enabling a variant of spatial diversity, called closed loop uplink beamforming transmit diversity, is illustrated. That is, system 300 may include a base station 320 serving each cell. In some examples, the base station 320 may be the same as the Node B 208 illustrated in FIG. 2. That is, the base station 320 provides a wireless access point to a core network for any number of mobile apparatuses, such as the UE 316. Here, in some examples the UE 316 may be the same as the UE 210 illustrated in FIG. 2.

Uplink transmit diversity (ULTD) schemes employ more than one transmit antenna (usually two) 316 at the UE 310 to improve the uplink transmission performance, e.g., to reduce the UE transmit power, or to increase the UE coverage range, or to increase the UE data rate, or a combination of the above. It can also help improve the overall system capacity. Based on the feedback requirements, ULTD schemes can be categorized into closed-loop (CL) and open-loop (OL) schemes. From the transmitter perspective, ULTD schemes can be classified as beamforming (BF) and antenna switching (AS) schemes.

In general, closed-loop transmit diversity (CLTD) schemes require the receiver (in this case, the base station 320) to provide explicit feedback information about the spatial channel to assist the transmitter (here, the UE 310) in choosing a transmission format over multiple transmit antennas.

One category of CLTD schemes is the CLTD beamforming scheme, where the base station 320 feeds back to the UE 310 a precoding (or beamforming) weight vector to be used over the multiple transmit antennas 316 so that the signals received at the base station 320 are constructively added. This in turn can improve the receiver signal to noise ratio (SNR) and achieve the beamforming effect.

Thus, in an aspect of the present disclosure, the UE 310 may include a transmit diversity circuit 312, which may be operable to implement one or more uplink transmit diversity schemes, including but not limited to the CLTD beamforming scheme. Further, transmit diversity circuit 312 may include a beamforming weight vector circuit 314 that may be operable to enable beamforming using, e.g., one or more received beamforming weight vectors. Still further, the base station 320 may include an uplink transmit diversity circuit 322, which may be operable to receive and process one or more uplink transmit diversity signals. Still further, uplink transmit diversity circuit 322 may include a beamforming weight vector circuit 324, which may be operable to generate beamforming weight vectors to send as feedback to the UE 310, to provide the feedback corresponding to the closed loop uplink transmit diversity with beamforming.

In one aspect of the system 300, base station 320 may conduct a downlink (DL) communication to UE 310 via transceivers and antennas 326. At the UE 310, the DL communication may be received via antennas 316 and transceivers. In one aspect of the system 300, the DL communication information may include a beamforming weight vector. In another aspect, UE 310 may conduct an uplink (UL) communication to base station 320 via transceivers and antennas 316. At the base station 320, the UL communication may be received via antennas 326 and transceivers. In one aspect of the system 300, information communicated from the UE 310 to the base station 320 may be transmitted by applying the beamforming weight vector to the transmitted signal.

In operation, a CLTD beamforming scheme may include the UE 310 transmitting an uplink transmit diversity signal, including multiple pilots, from multiple antennas 316 to the base station 320. Further, the transmit diversity circuit 322 associated with the base station 320 may receive the uplink transmit diversity signal transmission and generate an estimate of the uplink channel based on the received pilots. The beamforming weight vector circuit 324 may determine phase and/or amplitude values according to the estimated uplink channel values, to improve or maximize a received signal to noise ratio of data and control channels and a primary pilot channel if the primary pilot channel is on the same beam as the data and control channels. Further, the beamforming weight vector circuit 324 may generate a beamforming weight vector from the determined values and may transmit the beamforming weight vector to the UE 310. In some examples wherein the UE 310 may modify the beamforming weight vector it receives from the base station 320, the beamforming weight vector circuit 324 may infer the phase utilized by the UE 310 in the generation of the channel estimate. In one aspect of the system 300, the beamforming weight vector may be transmitted to the UE 310 using a fractional transmitted precoding indicator channel (F-TPICH). Still further, the UE 310 may receive the beamforming weight vector, and the beamforming vector circuit 314 may apply the beamforming weight vector information to one or more data channels and one or more control channels. In one aspect, the data channels may include: one or more enhanced dedicated physical data channels (E-DPDCH), one or more R99 dedicated physical data channels (DPDCH), etc. Further, in one aspect, the control channels may include: one or more enhanced dedicated physical control channels (E-DPCCH), etc. Further, one or more pilot channels may be transmitted from the UE 310 using one or more dedicated physical control channels (DPCCH).

In the uplink transmit diversity scheme, the respective data and control channels may be allocated among plural virtual antennas, also called precoding or beamforming vectors. That is, one or more of the data and control channels may be transmitted on a first virtual antenna utilizing first beamforming weight vector information, and one or more other ones of the data and control channels may be transmitted on a second virtual antenna utilizing second beamforming weight vector information. In one aspect of the system 300, pilot channel transmissions may be time aligned.

Conventional beamforming CLTD systems have been implemented in various forms. The most basic form of a beamforming CLTD transmitter may apply a beamforming weight vector asymmetrically among a plurality of transmit antennas. A more advanced beamforming CLTD transmitter may apply the beamforming weight vector symmetrically among the transmit antennas. To better describe these examples, FIG. 4 illustrates simplified schematic block diagrams of portions of a conventional asymmetric beamforming transmitter 400 and a symmetric beamforming transmitter 450.

Figure 4:
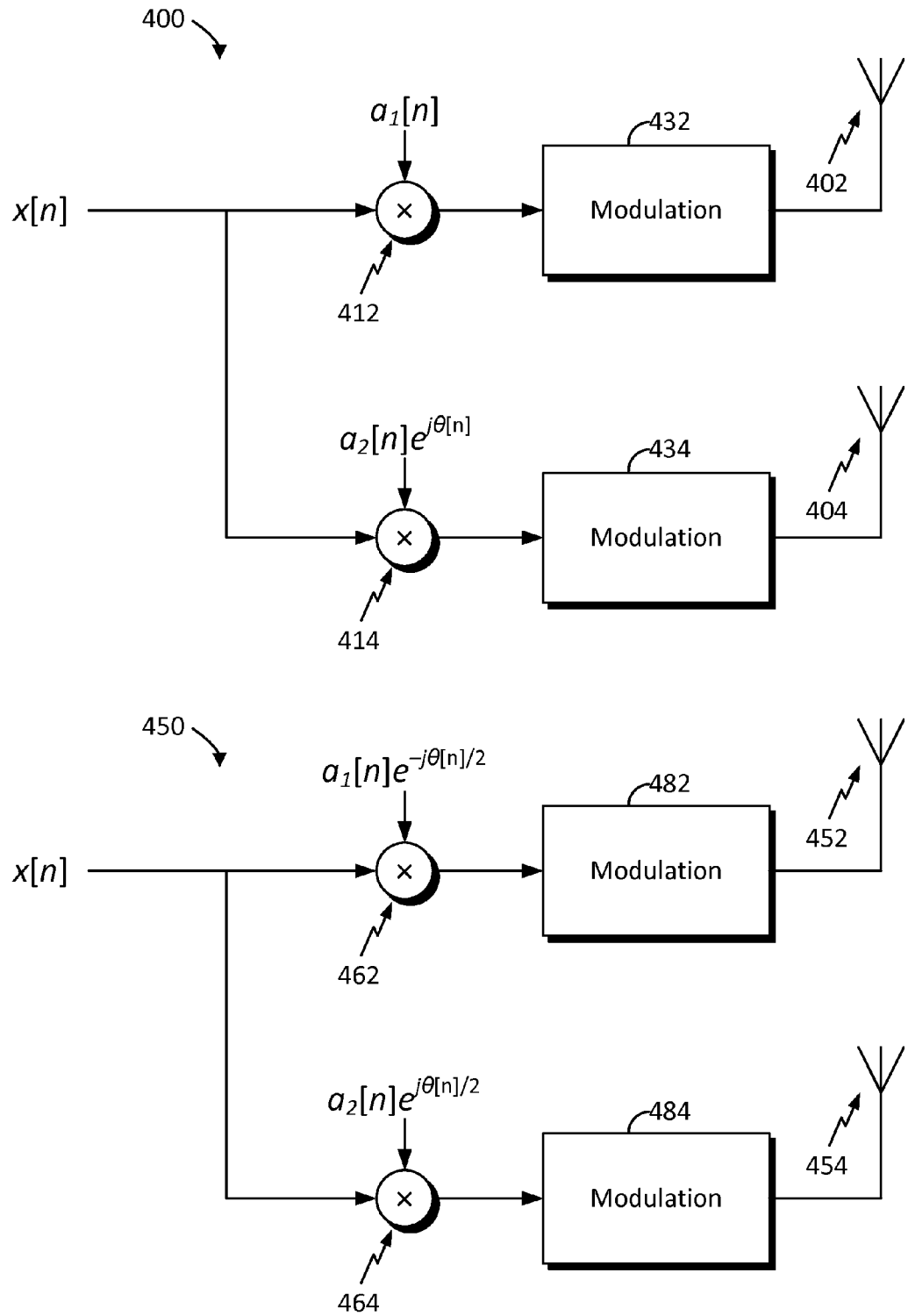
FIG. 4 is a block diagram comparing an asymmetric and a symmetric implementation of closed loop transmit diversity beamforming transmitters.

In the symmetric beamforming transmitter 400 of FIG. 4, it is shown that the transmitter 400, which may reside in a UE 310, has a first transmit antenna 402 and a second transmit antenna 404. In this example, the beamforming weight vector is:

$$[a_1 a_2 e^{j\theta}],$$

where $a_1^2 + a_2^2 = 1$, and the beamforming phase is denoted by $\theta$. The baseband signal (data and pilot channels) to be beamformed is indicated by x[n], where n is typically a slot index. The baseband signal x[n] may include one or more data channels, one or more control channels, and one or more pilots, such as a primary pilot channel. Here, the baseband signal x[n] may be mixed with the elements from the beamforming weight vector at mixers 412 and 414. The signals from the mixers may then be provided to respective modulation blocks 432 and 434. Thus, the baseband signal to be transmitted at the first antenna 402 is:

$$a_1[n]x[n],$$

and the baseband signal to be transmitted at the second antenna 404 is:

$$a_2[n]e^{j\theta[n]}x[n].$$

Here, the slot index n indicates that the amplitude a and the phase θ may vary in each slot, indexed by the slot index n. By utilizing the above-described beamforming weight vector, it can be seen that the beamforming phase θ is utilized for rotating or shifting the signal to be transmitted on only one of the antennas, in an asymmetric fashion.

In some examples, the receiver of the transmitted signal may include a plurality of receive antennas, e.g., a first receive antenna and a second receive antenna. Consider the first receive antenna at the receiver side. The signal, when it is received by the receiver, is changed according to the composite channel response ĥ from the two transmit antennas to one of the receive antennas. For example, the composite channel response $\hat{h}_1$ experienced by x[n] at receive antenna 1 may be:

$$\hat{h}_1[n] = a_1[n]h_{11}[n] + a_2[n]e^{j\theta[n]}h_{12}[n],$$

where $h_{rt}[n]$ represents the channel response between the transmit antenna t and the receive antenna r.

The beamforming phase θ is typically quantized into a finite set, one example being {0, 90, 180, 270} degrees. Thus, the phase trajectory of the composite channel response $h_1[n]$ may be non-smooth, due to variation of the beamforming phases. This condition can affect the quality of the pilot filters at the receiver, which usually run over a window of multiple slots. Various aspects of the present disclosure provide techniques of reducing the phase discontinuity.

On the other hand, transmitter 450 illustrated in FIG. 4 is another example for implementing a transmitter for beamforming transmit diversity, wherein the beamforming phase θ is symmetrically split into half negative and half positive components (thus maintaining the beamforming effect). Here, one chain is transmitted through a mixer 462, modulation unit 482 and a first antenna 452, and the other chain is transmitted through a mixer 464, modulation unit 484 and a second antenna 454. As illustrated, the baseband signal transmitted at the first antenna 452 is:

$$a_1[n]e^{-j\theta[n]/2}x[n],$$

and the baseband signal transmitted at the second antenna 454 is:

$$a_2[n]e^{j\theta[n]/2}x[n].$$

That is, rather than being wholly apportioned to the baseband signal transmitted at the second antenna 404, as in the transmitter 400, at the symmetric implementation of transmitter 450 the beamforming phase θ is divided in half, with a first half being subtracted from the baseband signal transmitted at the first antenna 452, and a second half being added to the baseband signal transmitted at the second antenna 454. In this way, the phase difference between the two streams is the same as that accomplished with the asymmetric implementation 400.

In this example, consider the first receive antenna r at the receiver side. The composite channel response $\hat{h}_1[n]$ experienced by the baseband signal x[n] is:

$$\hat{h}_1[n] = a_1[n]e^{-j\theta[n]/2}h_{11}[n] + a_2[n]e^{j\theta[n]/2}h_{12}[n].$$

The following special case will help explain the benefit of this symmetric implementation of beamforming. For ease of explanation, let the channel $h_{rt}[n]$ between the transmit antenna t and the receive antenna r be static. Without a loss of generality, let $h_{11}[n] = h_{12}[n] = 1$. Here, the beamforming allows equal transmit power allocation $a_1[n] = a_2[n] = 1/\sqrt{2}$. In this case, the composite channel response $\hat{h}_1$ experienced by x[n] becomes:

$$\hat{h}_1[n] = 1/\sqrt{2} \times (e^{-j\theta[n]/2}) = \sqrt{2} \times \cos(\theta[-n]),$$

which has a constant phase of 0.

Figure 5:
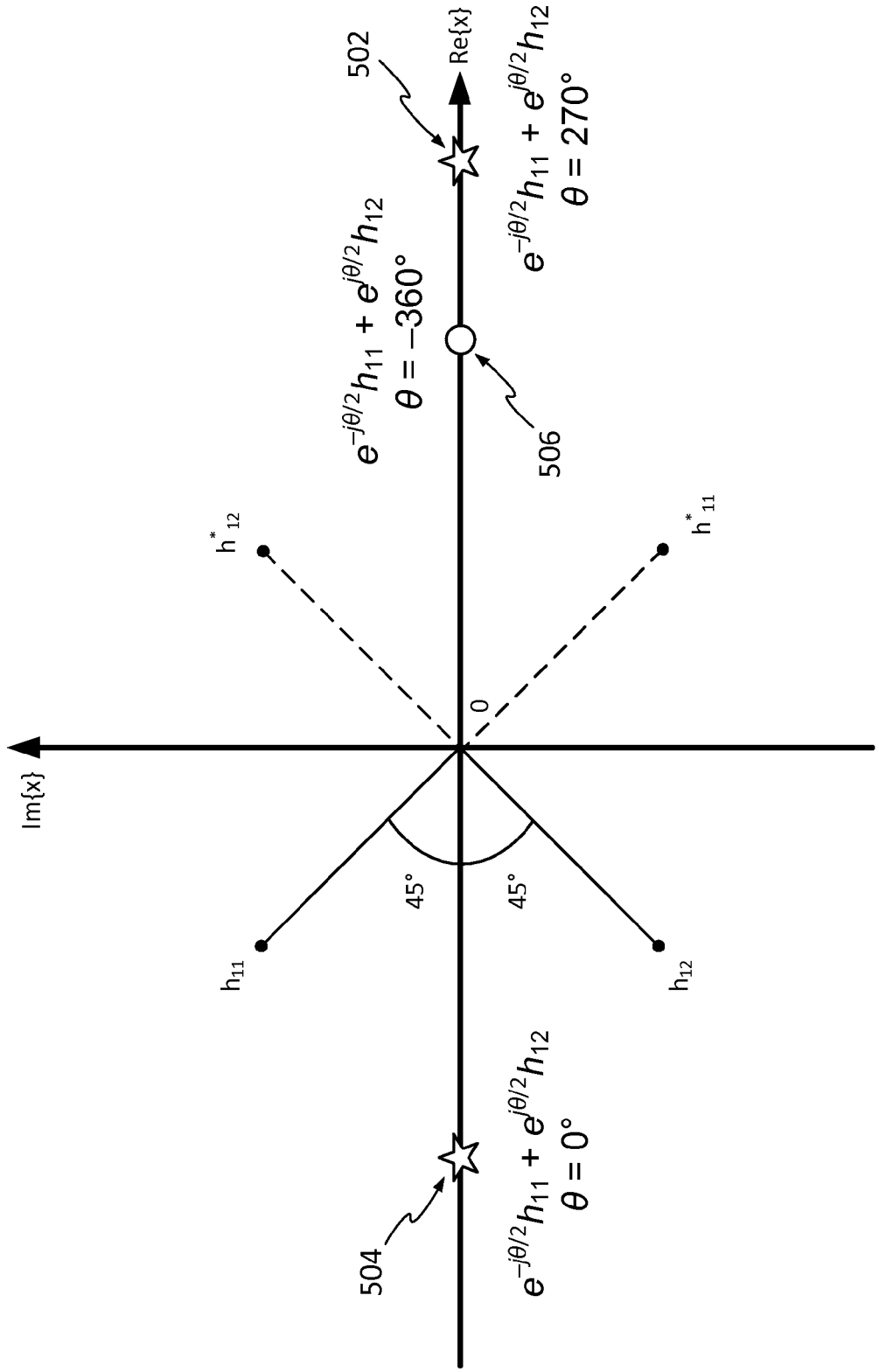
FIG. 5 is a chart of the complex plane, illustrating the movement of a composite channel response by rotating a beamforming phase.

However, this symmetric implementation does have a downside in a case wherein the beamforming phase θ has a finite quantization, which is very likely to happen in practice. FIG. 5 is a chart of the complex plane that illustrates this issue, showing the effect of phase choice in symmetric implementation of beamforming.

For example, the quantization set for the beamforming phase θ may be {0, 90, 180, 270}. In one example, let the channel response be:

$$h_{11}[n]=e^{j(3\pi/4)},$$

and $$h_{12}[n]=e^{-j(3\pi/4)},$$

and let the same values for the channel response hold for slot n+1 as well.

Further, let the beamforming weight vector always have equal transmit power allocation (i.e., $a_1=a_2$). Thus, in this example, the only variable is the beamforming phase θ. In slot n, let the beamforming phase θ be 270 degrees, which is optimal. As shown in FIG. 5, the composite channel response 502 has a value of 2.

In the next slot n+1, due to sub-optimality, let the beamforming phase be 0 degrees. As shown in FIG. 5, in this case, the composite channel response 504 is $-\sqrt{2}$. If a pilot filter at the UE were to average over these two slots n and n+1 to obtain a channel estimate for data demodulation, etc., the channel estimate would be:

$$(2-\sqrt{2})/2=0.293,$$

which has a very small amplitude (signal quality) due to the opposite sign of the composite channel response in two consecutive slots. Due to noise and interference, this small value will make the channel estimates have low signal to noise ratios. Thus, various aspects of the present disclosure address the potentially small amplitude of a channel estimate caused by sub-optimality of the beamforming phase in a symmetric beamforming CLTD transmitter.

Figure 6:
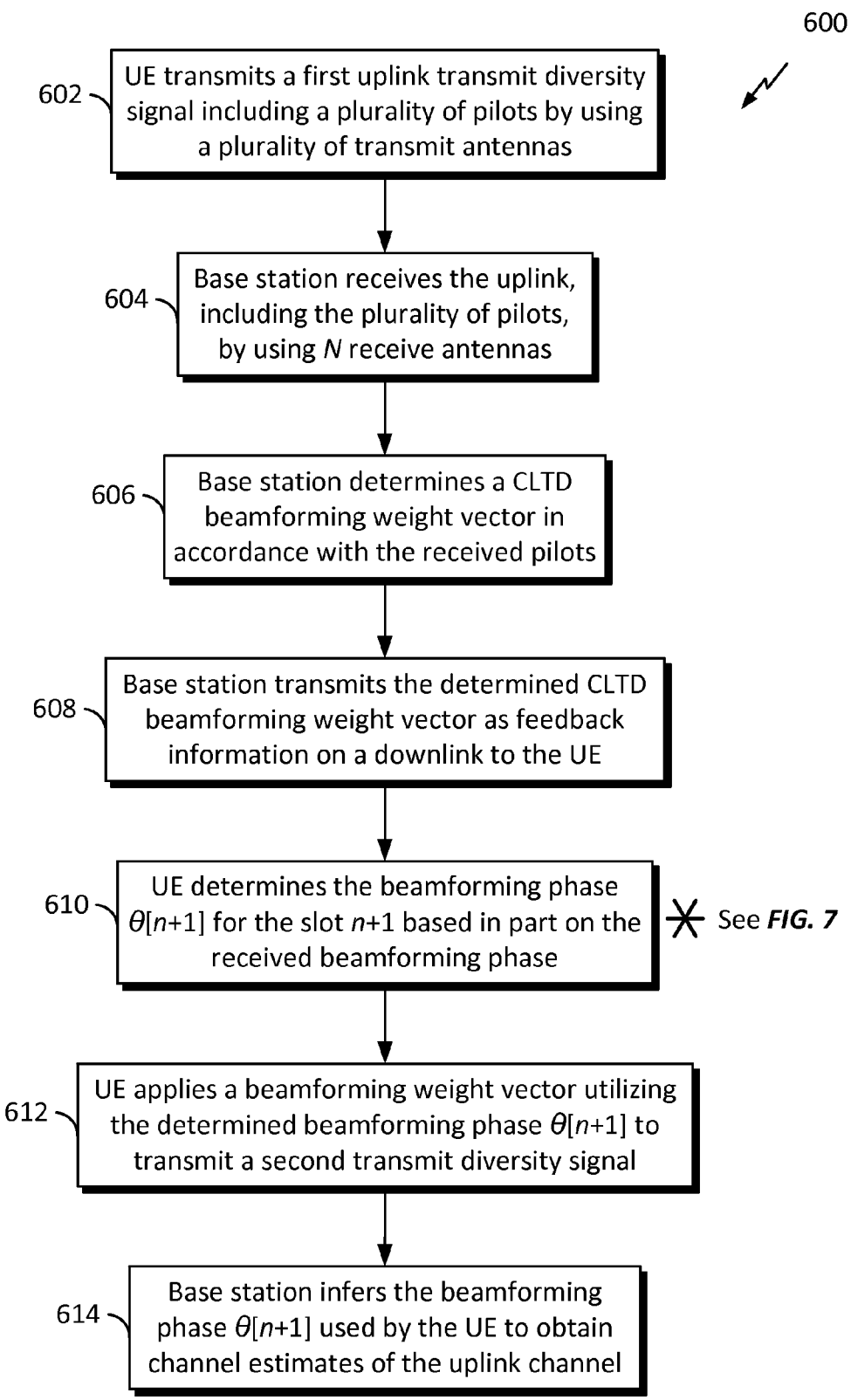
FIG. 6 is a flow chart illustrating a process of closed loop beamforming transmit diversity.

FIG. 6 illustrates various methodologies in accordance with some aspects of the disclosed subject matter. While, for purpose of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, with reference also to FIG. 3, exemplary method 600 for enabling transmit diversity using one or more beamforming schemes is illustrated. Generally, a UE 310 may transmit multiple pilot signals to a serving base station 320. In one aspect, the serving base station 320 may determine beamforming weight information and generate a beamforming weight vector for transmission to the UE 310. At reference numeral 602, the UE 310 may transmit, e.g., at slot n, a first uplink transmit diversity signal, including a plurality of pilots, by utilizing a plurality of transmit antennas. For example, the UE 310 may utilize dual transmit antennas 316, or any suitable number of transmit antennas, for a CLTD-beamforming transmission of the pilot channels, one or more data channels, and one or more control channels. Further, the UE 310 may utilize a symmetric beamforming transmitter such as the transmitter 450 illustrated in FIG. 4 for the uplink transmission. Here, the UE 310 may apply a suitable beamforming weight vector to the uplink CLTD transmission, including a beamforming phase θ[n].

At reference numeral 604, the base station 320 may receive the uplink transmission from the UE 310, including the plurality of pilots, by utilizing N receive antennas, where N may be any number from one or greater. At reference numeral 606, the base station 320 may determine a CLTD beamforming weight vector in accordance with the pilots received in block 604. As discussed later with reference to block 614, the determination of the beamforming weight vector in block 606 may include a step of inferring, based on the received transmission, the beamforming phase of the beamforming weight vector utilized by the UE 310, which may or may not be the same as the beamforming phase of the beamforming weight vector previously sent by the base station 320 to the UE 310.

At reference numeral 608, the base station 320 may transmit the CLTD beamforming weight vector determined in block 606, as feedback information on a downlink transmission to the UE 310. In one aspect of the present disclosure, the beamforming weight vector may be transmitted the UE 310 over a fractional transmitted precoding indicator channel (F-TPICH). In a further aspect of the present disclosure, the beamforming weight vector transmitted to the UE 310 may include amplitude and or phase information for one or more channels. For example, the beamforming weight vector may include power values for a primary pilot channel, and the UE 310 may derive power values for additional pilot channels from the received power values. In another aspect of the disclosure, the beamforming weight vector may include power values for each pilot channel.

Figure 7:
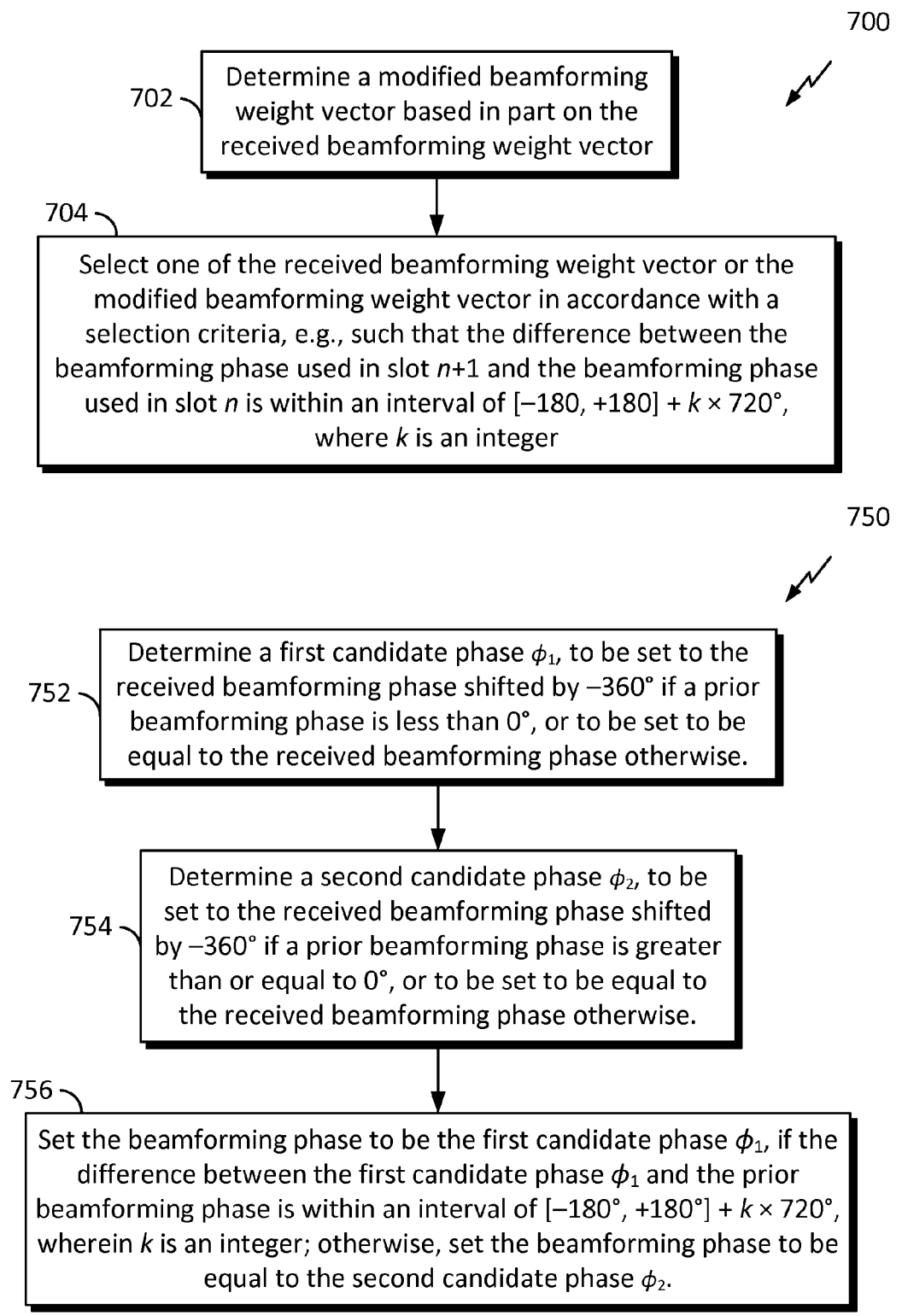
FIG. 7 is a flow chart illustrating details of the selection of a beamforming phase, operable at a UE.

At reference numeral 610, the UE 310 may determine a beamforming phase θ[n+1] for a slot n+1, wherein the beamforming phase θ[n+1] may be based in part on a received beamforming phase $\tilde{\theta}$[n+1] of the beamforming vector transmitted by the base station 320 in block 608. That is, in accordance with an aspect of the present disclosure, the UE 310 may modify the beamforming weight vector received from the base station 320. FIG. 7, described below, provides additional detail in relation to the determination of the beamforming phase θ[n+1].

At reference numeral 612, the UE 310 may apply a beamforming weight vector to a second uplink CLTD transmission. Here, the applied beamforming weight vector may utilize the determined beamforming phase θ[n+1], determined in block 610. As described in further detail below, the determined beamforming phase θ[n+1] may be the same as, or different from the received beamforming phase $\tilde{\theta}$[n+1], received in block 608.

At reference numeral 614, the base station 320 may infer the beamforming phase θ[n+1], determined in block 610 and utilized by the UE 310 in block 612 in the second uplink CLTD transmission, to obtain channel estimates of the uplink channel. That is, the base station 320 may recognize, based on the received transmission, that the UE 310 may have modified the beamforming weight vector from that vector transmitted by the base station at block 608. In this way, the base station 320 may improve the quality of its channel estimates in accordance with the recognition that the UE 310 modified the beamforming weight vector.

The selection of the beamforming phase θ in any particular slot, as described above in block 610, can be implemented according to certain rules to improve the channel estimate at the UE 310. That is, in some aspects, the disclosed approach introduced above provides an improved symmetric implementation of a beamforming transmitter. In one aspect of the approach, in an example wherein the received beamforming phase $\tilde{\theta}$ may be shifted by −360° to obtain a shifted beamforming phase $\tilde{\theta}^*$, the quantization set is expanded to {0, 90, 180, 270, −360, −270, −180, −90}. For example, instead of using 0°, the beamforming phase may be shifted to −360°. In terms of beamforming, 0° and −360° are equivalent phases. However, as described below, the shifting of the beamforming phase by −360° can nevertheless affect the channel estimate at the UE 310.

Referring again to the example illustrated in FIG. 5, in an aspect of the present disclosure, the beamforming phase may be shifted from 0° to −360°, resulting in a shift of the composite channel response from its first placement 504, at −√2, to a second placement 506, at √2. That is, after rotation of the received beamforming phase $\tilde{\theta}$ at 0° to utilize the shifted beamforming phase $\tilde{\theta}^*$ at −360°, the first channel response vector $h_{11}$ is shifted to a shifted first channel response vector $h^*_{11}$; and the second channel response vector $h_{12}$ is shifted to a shifted second channel response vector $h^*_{22}$. Here, because the beamforming phase $\tilde{\theta}$ is shifted by −360°, each of the shifted channel response vectors $h^*_{11}$ and $h^*_{12}$ may be respectively shifted by −180° due to the symmetric beamforming implementation of transmitter 450. In this case, as seen in FIG. 5, the two shifted channel response vectors $h^*_{11}$ and $h^*_{12}$ still add up quite constructively, giving rise to a composite channel response 506 of √2. For a pilot filter averaging over these two slots (i.e., having the first composite channel response at 502 and the second, shifted composite channel response 506) to obtain channel estimates for data demodulation, etc., the estimate would be:

(2+√2)/2=1.707, which is estimated to be 20 $\log_{10}(1.707/0.293)$=15.3 dB better than the averaged channel response calculated above utilizing the unshifted composite channel response 504.

To generalize, let the original quantized set of beamforming phases (unit: degrees) θ received as feedback from the base station be:

{θ₀+kθ_Δ, k=0, . . . ,N−1}, which has values internal to the range [0, 360] degrees. Here, k is an integer taking each integer value from 0 to N−1, where N represents the number of quantized phases. In accordance with an aspect of the present disclosure wherein the beamforming phase θ may be shifted by −360°, an expanded quantized set of phases may thus be defined to be:

{θ₀+kθ_Δ, k=0, . . . ,N−1}∪{θ₀+kθ₆₆−360, k=0, . . . ,N−1}.

In another example within the scope of the present disclosure, the following expanded set may be used instead, wherein the shift is by +360°:

{θ₀+kθ₆₆, k=0, . . . ,N−1}∪{θ₀+kθ_Δ+360, k=0, . . . ,N−1}.

Of course, those of ordinary skill in the art will comprehend that a shift in the phase, e.g., of any odd integer multiple of 360°, may be utilized within the scope of the present disclosure to expand the quantized set of phases.

Assume the beamforming phase utilized by the UE is θ[n] for slot n. For slot n+1, the initial received beamforming phase based on the original set is $\tilde{\theta}$[n+1]. In accordance with an aspect of the present disclosure, both the receiver and beamforming transmitter may determine the final beamforming phase θ[n+1] for the UE to use for slot n+1 in accordance with the following algorithm.

A first candidate phase $\phi_1$ and a second candidate phase $\phi_2$ may be determined in accordance with the received beamforming phase $\tilde{\theta}$[n+1] and a memory of the prior beamforming phase utilized by the UE in slot n, θ[n]. That is, if the prior beamforming phase θ[n] is less than zero, then the first candidate phase $\phi_1$ may be set to the received beamforming phase $\tilde{\theta}$[n+1] shifted by −360°. However, if the prior beamforming phase θ[n] is not less than zero, then the first candidate phase $\phi_1$ may be set to be equal to the received beamforming phase $\tilde{\theta}$[n+1]. That is:

$$\phi_1 = \begin{cases} \tilde{\theta}[n+1] - 360, & \text{if } \theta[n] < 0 \\ \tilde{\theta}[n+1], & \text{otherwise} \end{cases}.$$

Further, if the prior beamforming phase θ[n] is greater than or equal to zero, then the second candidate phase $\phi_2$ may be set to the received beamforming phase $\tilde{\theta}$[n+1] shifted by −360°. However, if the prior beamforming phase θ[n] is not greater than or equal to zero, then the second candidate phase $\phi_2$ may be set to be equal to the received beamforming phase $\tilde{\theta}$[n+1]. That is:

$$\phi_2 = \begin{cases} \tilde{\theta}[n+1] - 360, & \text{if } \theta[n] \geq 0 \\ \tilde{\theta}[n+1], & \text{otherwise} \end{cases}.$$

Finally, based on the candidate phases $\phi_1$ and $\phi_2$, the final beamforming phase θ[n+1] may be determined. Here, if the absolute value of the difference between the first candidate phase $\phi_1$ and the prior beamforming phase θ[n] is less than or equal to 180 degrees, then the final beamforming phase θ[n+1] may be set to the first candidate phase $\phi_1$. Otherwise, the final beamforming phase θ[n+1] may be set to the second candidate phase $\phi_2$. That is:

if |φ₁−θ[n]|≤180 °,

θ[n+1]=φ₁;

else

θ[n+1]=φ₂.

To illustrate, again referring to the example illustrated in FIG. 5, the composite channel response 502 arose utilizing the beamforming phase θ[n]=270°. Here, as described above, the received beamforming phase $\tilde{\theta}$[n+1]=0°. Thus, because the phase of θ[n] is not less than zero, the first candidate phase $\phi_1$ is set to $\tilde{\theta}$[n+1]=0°. Further, because the phase of θ[n] is greater than or equal to zero, the second candidate phase $\phi_2$ is set to $\tilde{\theta}$[n+1]−360°=−360°. Finally, the final beamforming phase θ[n+1] is determined by noting that:

|φ₁−θ[n]|=|0°−270°|=270°, which is not less than or equal to 180°. Thus, in this example, θ[n+1]=φ₂=−360°.

Thus, in accordance with various aspects of the present disclosure, the algorithm described above may be utilized to ensure that the difference between two consecutive beamforming phases θ[n] and θ[n+1] is in an interval of [−180, +180]+(k×720) degrees, where k is an integer.

FIG. 7 is a flow chart illustrating additional detail of block 610 of FIG. 6, wherein the UE 310 determines the beamforming phase θ[n+1] in accordance with some aspects of the present disclosure. Here, process 700 and process 750 include some aspects of the disclosure wherein the UE 310 determines the beamforming phase θ[n+1].

For example, at reference numeral 702, the UE 310 may determine a modified beamforming weight vector based in part on the received beamforming weight vector. For example, in some aspects of the present disclosure the modified beamforming weight vector may be the received beamforming weight vector having its beamforming phase shifted by −360°. At reference numeral 704, the UE 310 may select one of the received beamforming weight vector or the modified beamforming weight vector, in accordance with a suitable selection criteria. That is, the UE 310 may determine to utilize the received beamforming weight vector, or the UE 310 may determine to utilize the modified beamforming weight vector. In some examples, the selection criteria may be adapted such that the difference between the beamforming phase used in slot n+1 and the beamforming phase used in slot n is within an interval [−180, +180]+k×720°, where k is an integer.

In another example within the scope of the present disclosure, in process 750, the selection of the beamforming weight vector may utilize candidate phases $\phi_1$ and $\phi_2$. That is, at reference numeral 752, the UE 310 may determine a first candidate phase $\phi_1$, to be set to the received beamforming phase $\tilde{\theta}$[n+1] shifted by −360° if a prior beamforming phase θ[n] is less than 0°, or to be set to be equal to the received beamforming phase $\tilde{\theta}$[n+1] otherwise. At reference numeral 754, the UE 310 may determine a second candidate phase $\phi_2$, to be set to the received beamforming phase $\tilde{\theta}$[n+1] shifted by −360° if a prior beamforming phase θ[n] is greater than or equal to 0°, or to be set to be equal to the received beamforming phase $\tilde{\theta}$[n+1] otherwise.

At reference numeral 756, the UE 310 may set the beamforming phase θ[n+1] to be the first candidate phase $\phi_1$, if the difference between the first candidate phase $\phi_1$ and the prior beamforming phase θ[n] is within an interval of [−180°, +180°]+k×720°, wherein k is an integer; otherwise, the UE 310 may set the beamforming phase θ[n+1] to be equal to the second candidate phase $\phi_2$.

Upon determining the beamforming phase θ[n+1], the UE 310 may store the determined phase, or the beamforming vector corresponding to the determined beamforming phase, in a memory. In this way, the determined beamforming phase can be utilized as a prior beamforming phase in a subsequent slot for a determination of a subsequent beamforming phase. Thus, the process may repeat, with each determined beamforming phase utilizing a memory of the prior beamforming phase, in sequence.

Figure 8:
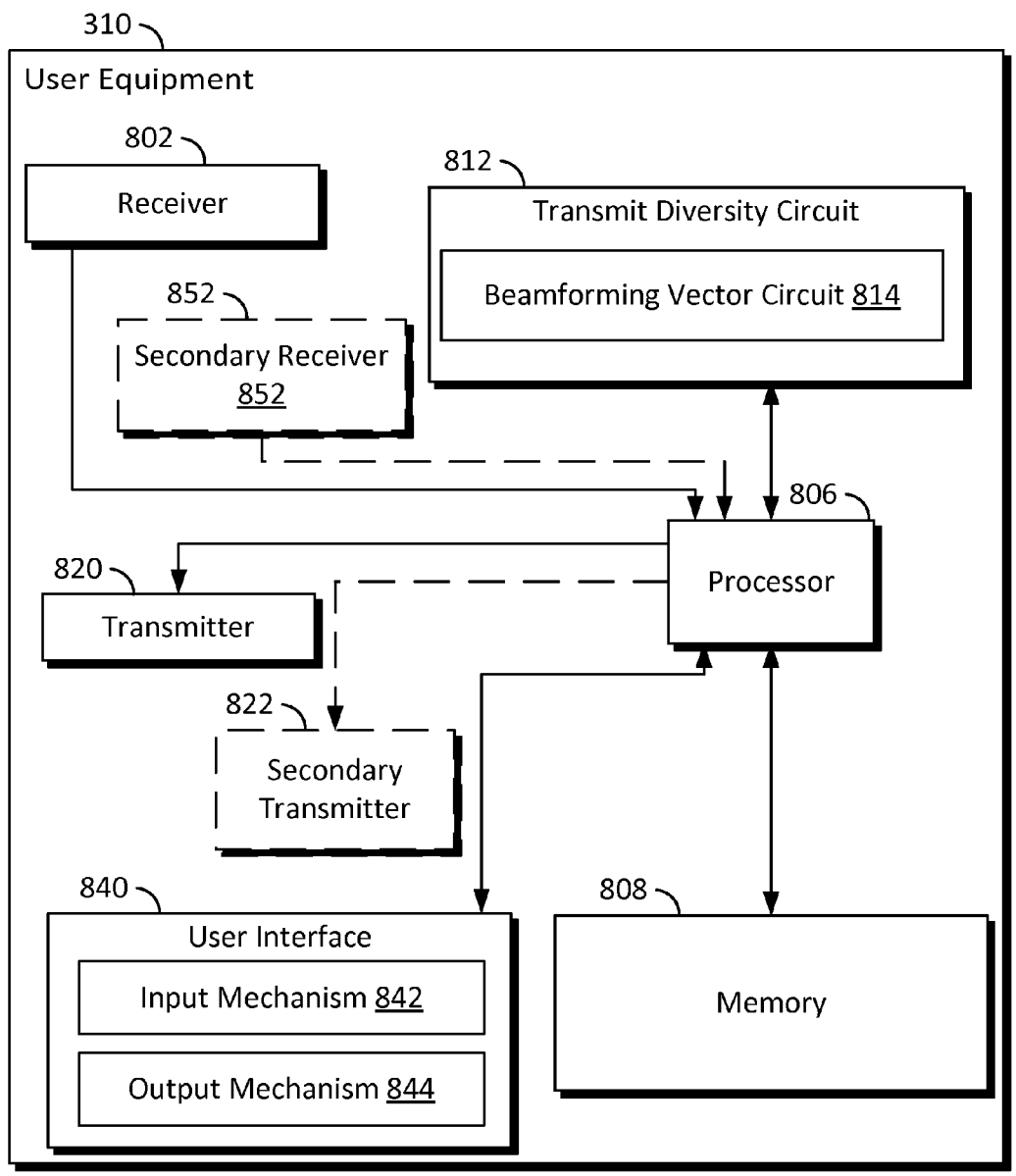
FIG. 8 is a block diagram of a UE configured for closed loop transmit diversity beamforming.

With reference now to FIG. 8, an illustration of a wireless UE 310 that enables uplink transmit diversity using one or more beamforming schemes is presented. UE 310 includes a receiver 802 that may receive one or more signals from, for instance, one or more receive antennas (not shown), may perform typical actions on (e.g., filter, amplify, downconvert, etc.) the received signal, and may digitize the conditioned signal to obtain samples. Receiver 802 may include an oscillator for providing a carrier frequency for demodulation of the received signal and a demodulator for demodulating received symbols and providing them to processor 806 for channel estimation. In one aspect, the UE 310 may further include a secondary receiver 852 and may receive additional channels of information.

Processor 806 may be a processor dedicated to analyzing information received by receiver 802 and/or generating information for transmission by one or more transmitters 820 (for ease of illustration, only transmitter 820 and an optional secondary transmitter 822 are shown), a processor that controls one or more components of the UE 310, and/or a processor that both analyzes information received by receiver 802 and/or receiver 852, generates information for transmission by transmitter 820 for transmission on one or more transmitting antennas (not shown), and controls one or more components of the UE 310. In one aspect, the UE 310 may further include a secondary transmitter 822 and may transmit additional channels of information.

The UE 310 may additionally include a memory 808 that is operatively coupled to the processor 806, and may be configured to store data to be transmitted, received data, information related to available channels, data associated with analyzed signal and/or interference strength, information related to an assigned channel, power, rate, or the like, and any other suitable information for estimating a channel and communicating via the channel. The memory 808 may additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods is intended to include, without being limited to, these and any other suitable types of memory.

The UE 310 may further include a transmit diversity circuit 812 to enable transmit diversity communications. Transmit diversity circuit 812 may further include a beamforming vector circuit 814 for processing received beamforming weight vectors and applying beamforming information to at least one of data channels, control channels, or multiple pilot channels. In one aspect, data channels may include one or more of an enhanced dedicated physical data channel (E-DPDCH), a high speed dedicated physical data channel (HS-DPDCH), a Release-99 dedicated physical data channels (DPDCH), etc. Further, in one aspect, control channels may include an enhanced dedicated physical control channel (E-DPCCH), etc. Further, one or more pilot channels may be enabled using a DPCCH. Still further, the respective data and control channels may be transmitted on a dominant virtual antenna, and various beamforming schemes may differ with respect to application the beamforming information to the pilot channels. In one aspect, the beamforming weight vector information may also be applied to a first pilot channel. In another aspect, the beamforming weight vector information may be applied to a first pilot channel and information derived from the beamforming weight vector may be applied to a second pilot channel and/or additional pilot channels.

Additionally, the UE 310 may include a user interface 840. The user interface 840 may include an input mechanism 842 for generating inputs into the UE 310, and an output mechanism 842 for generating information for consumption by the user of UE 310. For example, the input mechanism 842 may include a mechanism such as a key or keyboard, a mouse, a touch-screen display, a microphone, etc. Further, for example, the output mechanism 844 may include a display, an audio speaker, a haptic feedback mechanism, a Personal Area Network (PAN) transceiver etc. In the illustrated aspects, output mechanism 844 may include a display operable to present media content that is in image or video format or an audio speaker to present media content that is in an audio format.

Figure 9:
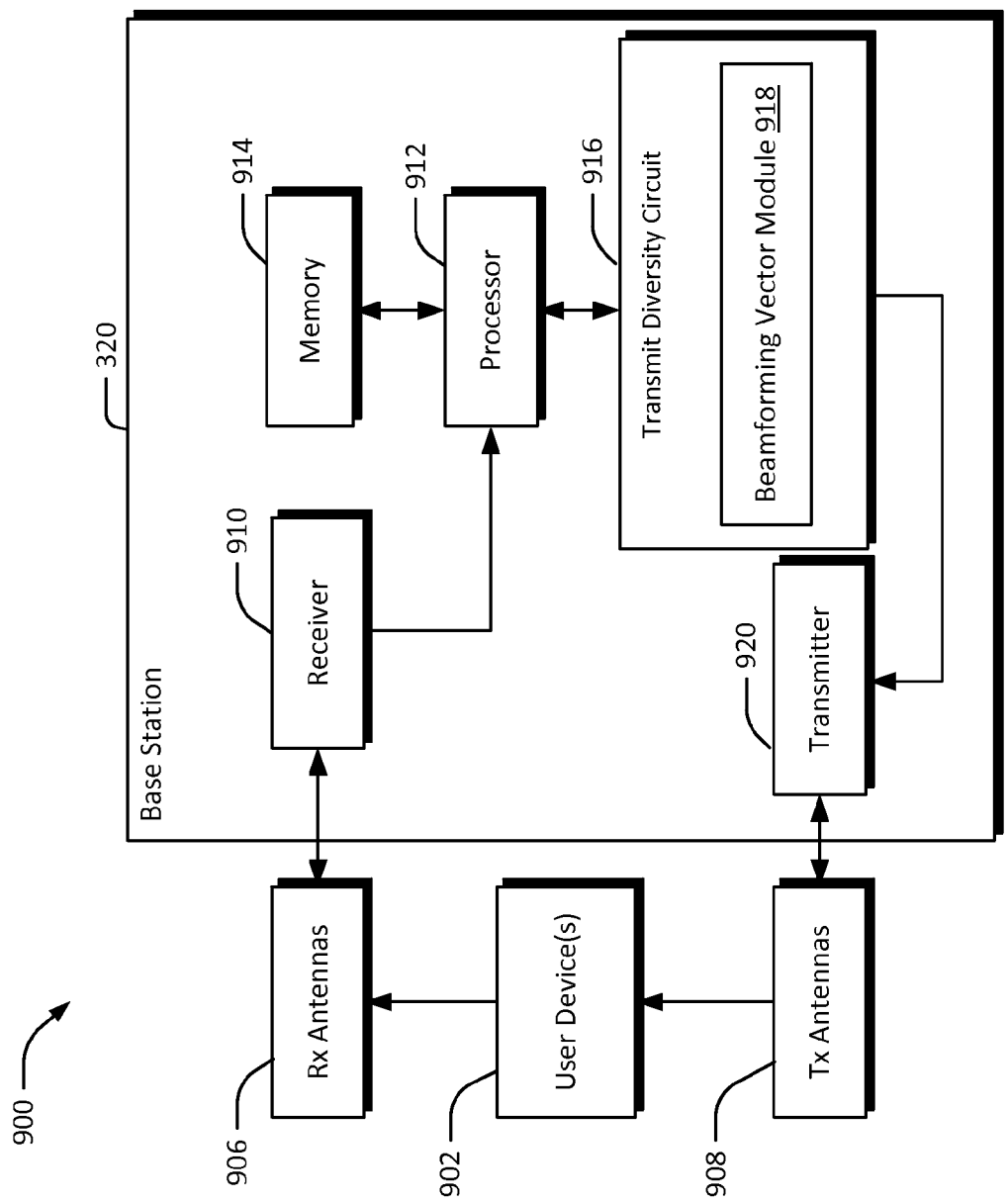
FIG. 9 is a block diagram of a base station configured for closed loop transmit diversity beamforming.

With reference now to FIG. 9, an example system 900 that includes a base station 320 having a receiver 910 for receiving signal(s) from one or more user devices 902, through a plurality of receive antennas 906, and a transmitter 920 for transmitting to the one or more user devices 902 through a plurality of transmit antennas 908. Receiver 910 may receive information from the receive antennas 906. Symbols may be analyzed by a processor 912, which may be similar to the processors 104 and/or 806 described above, and which may be coupled to a memory 914 for storing information related to wireless data processing. Processor 912 may further be coupled to a transmit diversity circuit 916, which may facilitate processing signals received from transmit diversity enabled user devices 902. In one aspect, the transmit diversity circuit 916 may process multiple received pilot channels from a user device 902. In such an aspect, the transmit diversity circuit 916 may further include a beamforming vector circuit 918 operable for determining phase and/or amplitude values, from the estimated uplink channel values, to improve or maximize a received signal to noise ratio of data and control channels and a primary pilot channel if the primary pilot channel is on the same beam as the data and control channels. In one aspect of the present disclosure, the primary pilot channel may be the first pilot channel. Further, the beamforming vector circuit 918 may generate a beamforming weight vector from the determined values and may transmit the beamforming weight vector to the user device 902. In one aspect, the beamforming weight vector may be transmitted using a fractional transmitted precoding indicator channel (F-TPICH). Signals may be multiplexed and/or prepared for transmission by a transmitter 920 through one or more transmit antennas 908 to the user device 902.

Figure 10:
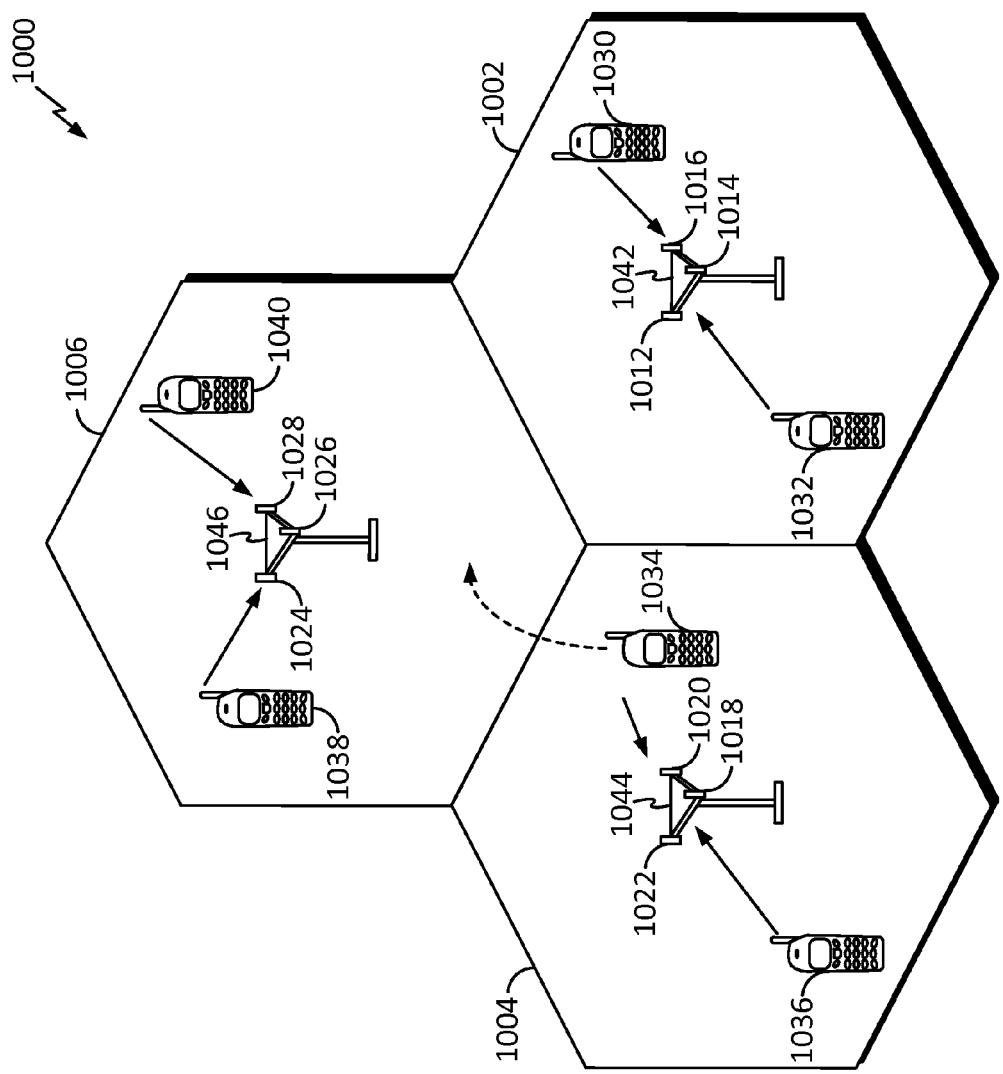
FIG. 10 is a conceptual diagram illustrating an example of an access network.

The various concepts presented throughout this disclosure may be implemented across a broad variety of telecommunication systems, network architectures, and communication standards. Referring to FIG. 10, by way of example and without limitation, a simplified access network 1000 in a UMTS Terrestrial Radio Access Network (UTRAN) architecture, which may utilize HSPA, is illustrated. The system includes multiple cellular regions (cells), including cells 1002, 1004, and 1006, each of which may include one or more sectors.

In a cell that is divided into sectors, the multiple sectors within a cell can be formed by groups of antennas with each antenna responsible for communication with UEs in a portion of the cell. For example, in cell 1002, antenna groups 1012, 1014, and 1016 may each correspond to a different sector. In cell 1004, antenna groups 1018, 1020, and 1022 each correspond to a different sector. In cell 1006, antenna groups 1024, 1026, and 1028 each correspond to a different sector.

The cells 1002, 1004 and 1006 may include several UEs that may be in communication with one or more sectors of each cell 1002, 1004 or 1006. For example, UEs 1030 and 1032 may be in communication with Node B 1042, UEs 1034 and 1036 may be in communication with Node B 1044, and UEs 1038 and 1040 may be in communication with Node B 1046. Here, each Node B 1042, 1044, 1046 is configured to provide an access point to a core network 204 (see FIG. 2) for all the UEs 1030, 1032, 1034, 1036, 1038, 1040 in the respective cells 1002, 1004, and 1006.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, comprising:
  transmitting a first uplink transmit diversity signal by applying a first beamforming weight vector;

receiving a beamforming weight vector in response to the first uplink transmit diversity signal;
determining a modified beamforming weight vector based on the received beamforming weight vector;
selecting one of the received beamforming weight vector or the modified beamforming weight vector in accordance with a selection criteria, the selection criteria being based on a difference between a phase of the selected beamforming weight vector and a phase of the first beamforming weight vector; and
transmitting a second uplink transmit diversity signal by applying the selected beamforming weight vector.

2. The method of claim 1, wherein determining the modified beamforming weight vector comprises shifting a phase of the received beamforming weight vector by −360°.

3. The method of claim 1, wherein the selection criteria is adapted such that the difference between the phase of the selected beamforming vector and the phase of the first beamforming vector is within an interval of [−180°, +180°]+k×720°, and wherein k is an integer.

4. The method of claim 1, wherein determining the modified beamforming weight vector comprises shifting a phase of the received beamforming weight vector by an odd integer multiple of 360°.

5. A method of wireless communication operable at a user equipment, comprising:
transmitting a first uplink transmit diversity signal by applying a first beamforming weight vector;
receiving a beamforming weight vector in response to the first uplink transmit diversity signal;
determining a first candidate phase based on a phase of the first beamforming weight vector;
determining a second candidate phase based on a phase of the first beamforming weight vector;
selecting one of the first candidate phase or the second candidate phase in accordance with a selection criteria, the selection criteria being based on a difference between the first candidate phase and the phase of the first beamforming weight vector; and
transmitting a second uplink transmit diversity signal by applying the selected one of the first candidate phase or the second candidate phase.

6. The method of claim 5,
wherein determining the first candidate phase comprises setting the first candidate phase equal to a phase of the received beamforming vector shifted by an odd integer multiple of 360° if the phase of the first beamforming vector is less than 0°, or equal to the phase of the received beamforming vector otherwise, and
wherein determining the second candidate phase comprises setting the second candidate phase equal to the phase of the received beamforming vector shifted by an odd integer multiple of 360° if the phase of the first beamforming vector is greater than or equal to 0°, or equal to the phase of the received beamforming vector otherwise.

7. The method of claim 5, wherein selecting one of the first candidate phase or the second candidate phase comprises:
selecting the first candidate phase if the difference between the first candidate phase and the phase of the first beamforming vector is within an interval of [−180°, +180°]+k×720°, wherein k is an integer; and
selecting the second candidate phase otherwise.

8. A user equipment configured for wireless communication, comprising:
at least one processor;
a memory coupled to the at least one processor;
a transmitter coupled to the at least one processor for transmitting a first uplink transmit diversity signal by applying a first beamforming weight vector; and
a receiver coupled to the at least one processor for receiving a beamforming weight vector in response to the first uplink transmit diversity signal,
wherein the at least one processor is configured to:
determine a modified beamforming weight vector based on the received beamforming weight vector;
select one of the received beamforming weight vector or the modified beamforming weight vector in accordance with a selection criteria, the selection criteria being based on a difference between a phase of the selected beamforming weight vector and a phase of the first beamforming weight vector; and
transmit a second uplink transmit diversity signal by applying the selected beamforming weight vector.

9. The user equipment of claim 8, wherein the at least one processor is configured to determine the modified beamforming weight vector by shifting a phase of the received beamforming weight vector by −360°.

10. The user equipment of claim 8, wherein the selection criteria is adapted such that the difference between the phase of the selected beamforming vector and the phase of the first beamforming vector is within an interval of [−180°, +180°]+k×720°, and wherein k is an integer.

11. The user equipment of claim 8, wherein the at least one processor is configured to determine the modified beamforming weight vector by shifting a phase of the received beamforming weight vector by an odd integer multiple of 360°.

12. A user equipment configured for wireless communication, comprising:
at least one processor;
a memory coupled to the at least one processor;
a transmitter coupled to the at least one processor for transmitting a first uplink transmit diversity signal by applying a first beamforming weight vector; and
a receiver coupled to the at least one processor for receiving a beamforming weight vector in response to the first uplink transmit diversity signal,
wherein the at least one processor is configured to:
determine a first candidate phase based on a phase of the first beamforming weight vector;
determine a second candidate phase based on a phase of the first beamforming weight vector;
select one of the first candidate phase or the second candidate phase in accordance with a selection criteria, the selection criteria being based on a difference between the first candidate phase and the phase of the first beamforming weight vector; and
transmit a second uplink transmit diversity signal by applying the selected one of the first candidate phase or the second candidate phase.

13. The user equipment of claim 12,
wherein the at least one processor is configured to determine the first candidate phase by setting the first candidate phase equal to a phase of the received beamforming vector shifted by an odd integer multiple of 360° if the phase of the first beamforming vector is less than 0°, or equal to the phase of the received beamforming vector otherwise; and
wherein the at least one processor is configured to determine the second candidate phase by setting the second candidate phase equal to the phase of the received beamforming vector shifted by an odd integer multiple of 360° if the phase of the first beamforming vector is greater than or equal to 0°, or equal to the phase of the received beamforming vector otherwise.

14. The user equipment of claim 12, wherein the at least one processor is configured to select one of the first candidate phase or the second candidate phase by:
    selecting the first candidate phase if the difference between the first candidate phase and the phase of the first beamforming vector is within an interval of [−180°, +180°]+k×720°, wherein k is an integer; and
    selecting the second candidate phase otherwise.

15. A user equipment configured for wireless communication, comprising:
    means for transmitting a first uplink transmit diversity signal by applying a first beamforming weight vector;
    means for receiving a beamforming weight vector in response to the first uplink transmit diversity signal;
    means for determining a modified beamforming weight vector based on the received beamforming weight vector;
    means for selecting one of the received beamforming weight vector or the modified beamforming weight vector in accordance with a selection criteria, the selection criteria being based on a difference between a phase of the selected beamforming weight vector and a phase of the first beamforming weight vector; and
    means for transmitting a second uplink transmit diversity signal by applying the selected beamforming weight vector.

16. The user equipment of claim 15, wherein the means for determining a modified beamforming weight vector is further for shifting a phase of the received beamforming weight vector by −360°.

17. The user equipment of claim 15, wherein the selection criteria is adapted such that the difference between the phase of the selected beamforming vector and the phase of the first beamforming vector is within an interval of [−180°, +180°]+k×720°, and wherein k is an integer.

18. The user equipment of claim 15, wherein the means for determining a modified beamforming weight vector is further for shifting a phase of the received beamforming weight vector by an odd integer multiple of 360°.

19. A user equipment configured for wireless communication, comprising:
    means for transmitting a first uplink transmit diversity signal by applying a first beamforming weight vector;
    means for receiving a beamforming weight vector in response to the first uplink transmit diversity signal;
    means for determining a first candidate phase based on a phase of the first beamforming weight vector;
    means for determining a second candidate phase based on a phase of the first beamforming weight vector;
    means for selecting one of the first candidate phase or the second candidate phase in accordance with a selection criteria, the selection criteria being based on a difference between the first candidate phase and the phase of the first beamforming weight vector; and
    means for transmitting a second uplink transmit diversity signal by applying the selected one of the first candidate phase or the second candidate phase.

20. The user equipment of claim 19,
    wherein the means for determining the first candidate phase is further for setting the first candidate phase equal to a phase of the received beamforming vector shifted by an odd integer multiple of 360° if the phase of the first beamforming vector is less than 0°, or equal to the phase of the received beamforming vector otherwise; and
    wherein the means for determining the second candidate phase is further for setting the second candidate phase equal to the phase of the received beamforming vector shifted by an odd integer multiple of 360° if the phase of the first beamforming vector is greater than or equal to 0°, or equal to the phase of the received beamforming vector otherwise.

21. The user equipment of claim 19, wherein the means for selecting one of the first candidate phase or the second candidate phase is further for:
    selecting the first candidate phase if the difference between the first candidate phase and the phase of the first beamforming vector is within an interval of [−180°, +180°]+k×720°, wherein k is an integer; and
    selecting the second candidate phase otherwise.

22. A non-transitory computer-readable medium storing executable code, operable at a user equipment, comprising:
    code for transmitting a first uplink transmit diversity signal by applying a first beamforming weight vector;
    code for receiving a beamforming weight vector in response to the first uplink transmit diversity signal;
    code for determining a modified beamforming weight vector based on the received beamforming weight vector;
    code for selecting one of the received beamforming weight vector or the modified beamforming weight vector in accordance with a selection criteria, the selection criteria being based on a difference between a phase of the selected beamforming weight vector and a phase of the first beamforming weight vector; and
    code for transmitting a second uplink transmit diversity signal by applying the selected beamforming weight vector.

23. The non-transitory computer-readable medium of claim 22, wherein the code for determining a modified beamforming weight vector includes code for shifting a phase of the received beamforming weight vector by −360°.

24. The non-transitory computer-readable medium of claim 22, wherein the selection criteria is adapted such that the difference between the phase of the selected beamforming weight vector and the phase of the first beamforming weight vector is within an interval of [−180°, +180°]+k×720°, and wherein k is an integer.

25. The non-transitory computer-readable medium of claim 22, wherein the code for determining a modified beamforming weight vector includes code for shifting a phase of the received beamforming weight vector by an odd integer multiple of 360°.

26. A non-transitory computer-readable medium storing executable code, operable at a user equipment, comprising:
    code for transmitting a first uplink transmit diversity signal by applying a first beamforming weight vector;
    code for receiving a beamforming weight vector in response to the first uplink transmit diversity signal;
    code for determining a first candidate phase based on a phase of the first beamforming weight vector;
    code for determining a second candidate phase based on a phase of the first beamforming weight vector;
    code for selecting one of the first candidate phase or the second candidate phase in accordance with a selection criteria, the selection criteria being based on a difference between the first candidate phase and the phase of the first beamforming weight vector; and
    code for transmitting a second uplink transmit diversity signal by applying the selected one of the first candidate phase or the second candidate phase.

27. The non-transitory computer readable medium of claim 26,
- wherein code for determining the first candidate phase is further for setting the first candidate phase equal to a phase of the received beamforming vector shifted by an odd integer multiple of 360° if the phase of the first beamforming vector is less than 0°, or equal to the phase of the received beamforming vector otherwise; and
- wherein the code for determining the second candidate phase is further for setting the second candidate phase equal to the phase of the received beamforming vector shifted by an odd integer multiple of 360° if the phase of the first beamforming vector is greater than or equal to 0°, or equal to the phase of the received beamforming vector otherwise.

28. The non-transitory computer-readable medium of claim 26,
- wherein the code for selecting one of the first candidate phase or the second candidate phase is further for:
- selecting the first candidate phase if the difference between the first candidate phase and the phase of the first beamforming weight vector is within an interval of $[-180°, +180°]+k\times 720°$, wherein k is an integer; and
- selecting the second candidate phase otherwise.

* * * * *